United States Patent [19]

Kuenzig

[11] 3,979,812

[45] Sept. 14, 1976

[54] CHAIN BREAKER

[76] Inventor: Frederick J. Kuenzig, 16 Bob White Way, Simsbury, Conn. 06070

[22] Filed: Oct. 7, 1974

[21] Appl. No.: 512,947

[52] U.S. Cl. .................................................... 29/260
[51] Int. Cl.[2] .......................................... B23P 19/04
[58] Field of Search ............ 59/7; 29/259, 257, 260, 29/243.54

[56] References Cited

UNITED STATES PATENTS

| | | | |
|---|---|---|---|
| 2,362,656 | 11/1944 | Medley | 29/260 |
| 2,622,389 | 12/1952 | Sjostrom et al. | 59/7 |
| 2,834,099 | 5/1958 | Gasper | 29/257 |

*Primary Examiner*—James L. Jones, Jr.
*Attorney, Agent, or Firm*—Spencer T. Smith

[57] ABSTRACT

A chain breaker comprising a lever bar, a U-shaped frame including a pair of opposing arms each having a bore extending therethrough for selectivey receiving the lever bar, the lever bar including a bore extending transversely therethrough for receiving a pin of a chain, means for maintaining the received lever bar with the pin receiving bore at a predetermined orientation, means for locating the received, oriented lever bar with the pin receiving bore thereof at a predetermined longitudinal position, a push out screw including an extractor pin, support means secured to the U-shaped frame for threadedly receiving the push out screw with the extractor pin in coaxial relation with the oriented and longitudinally positioned pin receiving bore of the received lever bar, the top of the U-shaped member including a through-bore for receiving the push out screw, and means for selectively rotating the threadedly received push out screw.

16 Claims, 3 Drawing Figures

CHAIN BREAKER

The present invention relates to chain breakers which are utilized to alter or repair motorcycle chain or the like.

It is an object of the present invention to provide a chain breaker which can be compactly stored in a motorcycle pouch or the like.

It is a further object of the present invention to provide a chain breaker which can be readily converted into an assembler for press fit master link assemblies, whereby a once broken chain can be readily reassembled.

Additional objects and advantages of the present invention will become apparent from the following portion of this specification and from the accompanying drawings which illustrate, in accordance with the mandate of the patent statutes, a presently preferred embodiments incorporating the teachings of the invention.

Referring to the drawings

Figure 1:
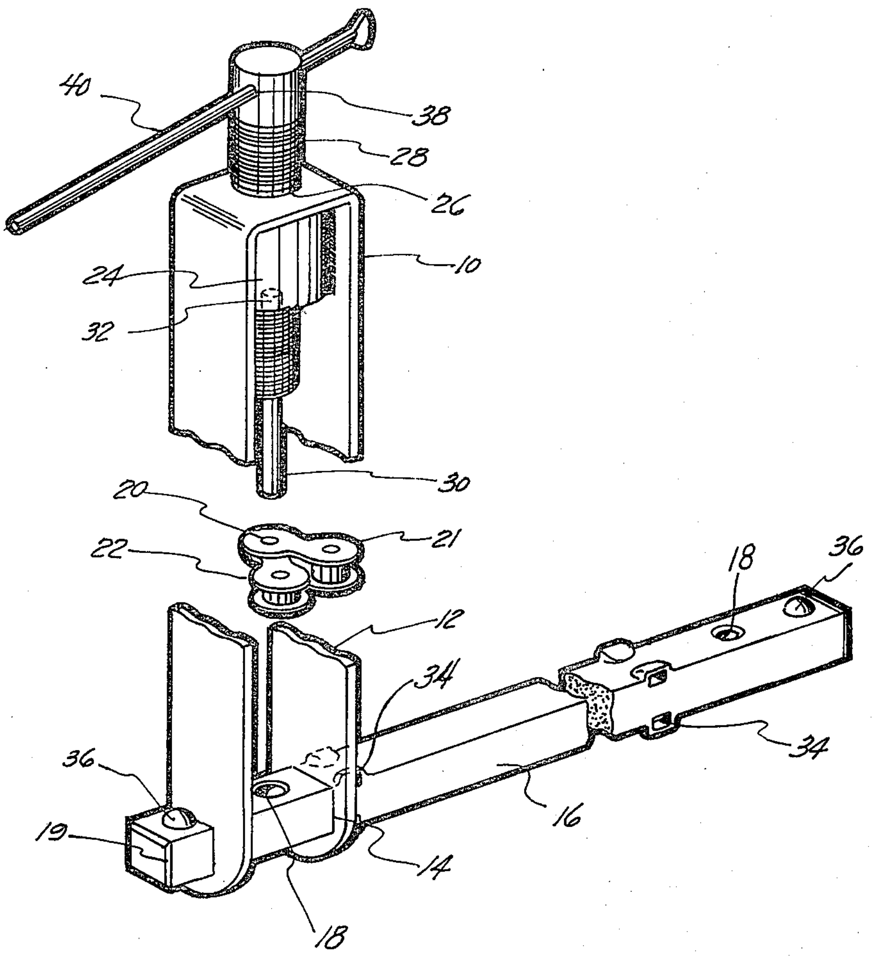
FIG. 1 is an oblique view, which has been broken for purposes of clarity, illustrating a chain breaker made in accordance with the teachings of the present invention.
Figure 2:
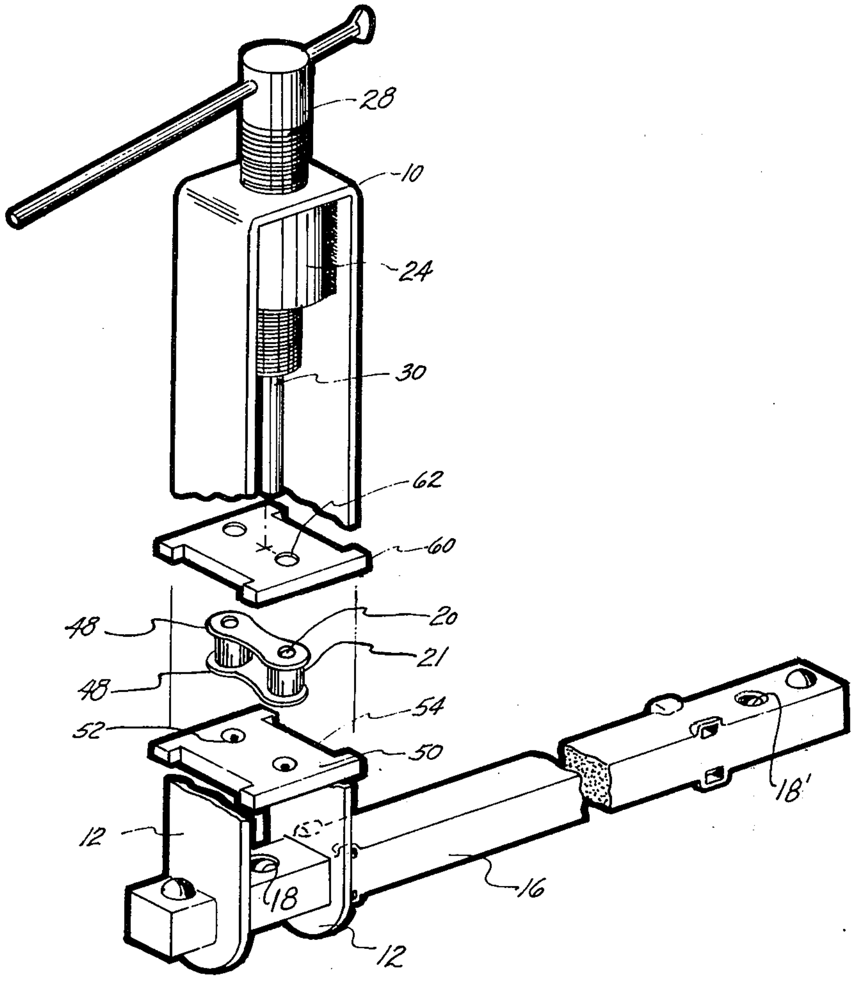
FIG. 2 is an oblique view, broken for purposes of clarity, of the chain breaker illustrated in FIG. 1, which has been converted to a structure for assembling a press fit master link assembly.

The chain breaker having the first preferred embodiment is illustrated in FIG. 1, and includes a U-shaped frame 10 having a pair of arms 12 extending in spaced, parallel relation. Each arm 12 includes, at the free end thereof, an aperture 14 of square configuration, with the sides thereof extending parallel to the sides of the arms, for matingly receiving a similarly configured elongated lever bar 16. The lever bar 16 has a transverse pin receiving bore 18, which extends completely through the bar in a direction perpendicular to a surface thereof, and which is selectively sized to permit passage of a chain pin 20, which may be a pin of a riveted master link assembly 21 of a motorcycle chain 22, therethrough.

The lever bar 16 can accordingly be inserted into the apertures 14 in the opposing U-shaped frame arms 12 with the pin receiving bore 18 extending in a direction parallel to the arms of the U-shaped frame and the pin receiving bore will be maintained at that desired orientation. The lever bar includes projections 34, which selectively limit the insertion of the lever bar to locate the properly oriented lever bar pin receiving bore 18 at a precise longitudinal position when the lever bar is fully inserted into the U-shaped frame arm opening 14 and a spring biased detent 36 maintains the lever arm at this fully advanced longitudinal position during usage of the chain breaker. The forward end of the lever arm may be beveled 19 to facilitate insertion.

A sleeve member 24, which is welded or otherwise secured to the U-shaped frame, includes an internal threaded bore 26, which extends completely therethrough, and which is continuous with a bore 26, which extends completely through the top portion of the U-shaped frame 10. The threaded bore 26 threadedly receives a push out screw 28 and is selectively oriented so that the axis of the push out screw will be coaxial with the axis of the pin receiving bore 18 when the lever bar 16 is fully inserted into the U-shaped frame apertures 14. An extractor pin 30 concentrically extends axially into a bore 32 at one end of the push out screw 28 and extends outwardly from the push out screw a distance predetermined to exceed the length of the chain pin 20. The extractor pin can be suitably secured therein or frictionally retained if desired. A transverse bore 38 is defined at the other end of the push out screw 28 for receiving a suitable handle 40 or screwdriver.

To break a chain, the end of a chain pin 20 of the link assembly 21 is placed in the lever bar pin receiving bore 18 and the push out screw 28 is hand-turned until the extractor pin 30 is firmly seated against the other end of the chain pin 20. The lever bar 16 and the handle have a length selected to permit manual gripping thereof whereby a torque can be applied to the screw member by rotating the handle in a predetermined direction relative to the lever bar whereby the chain pin can be pushed completely out of the pin receiving hole.

To assemble or reassemble a chain having a drive or press fit cover plates 48, a first fixture plate 50 having a pair of blind holes 52, which extend into the top surface thereof and which are selectively dimensioned and located to receive the pins 20 of the master link assembly, is located between the opposing arms of the U-shaped frame and is supported by the lever bar 16. To maintain these blind bores at a selected position, the first fixture plate 50 is of H-shape having opposing recesses 54 selectively configured for receiving the arms 12 of the U-shaped frame and having a width between the recesses approximately equal to the separation between the arms. The H-shaped plate 50 accordingly once inserted, cannot be rotated, tilted about an axis parallel to the lever bar, or transversely displaced, whereby the orientation and location of the blind holes will be precisely maintained.

A second identically configured H-shaped fixture plate 60 having a pair of master link pin receiving through-bores 62 is placed on top of a partially assembled master link with the pins thereof extending thereinto. The handle 40 and lever bar 16 are then rotated relative to one another to forcefully incrementally advance the extractor pin against the top surface of the upper H-shaped fixture plate until the desired attitude between the upper cover plate of the master link and the master link pins is achieved. Since the H-shaped plates can neither be rotated, tilted about an axis parallel to the lever bar, or transversely displaced, the force applied will be purely axial, thereby efficiently effecting the desired drive or press fit.

Preferably, the lever bar bore 18 has a size and the extractor pin 30 has a size and length selected for a given chain size and if desired, the chain breaker can be designed to precisely handle a second selected chain size by defining a second bore 18' in the lever bar having a size corresponding to the size of the pins of the second chain, and by replacing the removable extractor pin 30 with a second extractor pin (not shown) having a size and length corresponding to the pins of the second chain. A second pair of H-plates having through and blind bores selectively sized and located to matingly receive the pins of the second selected size of chain may also be provided, if desired.

Figure 3:
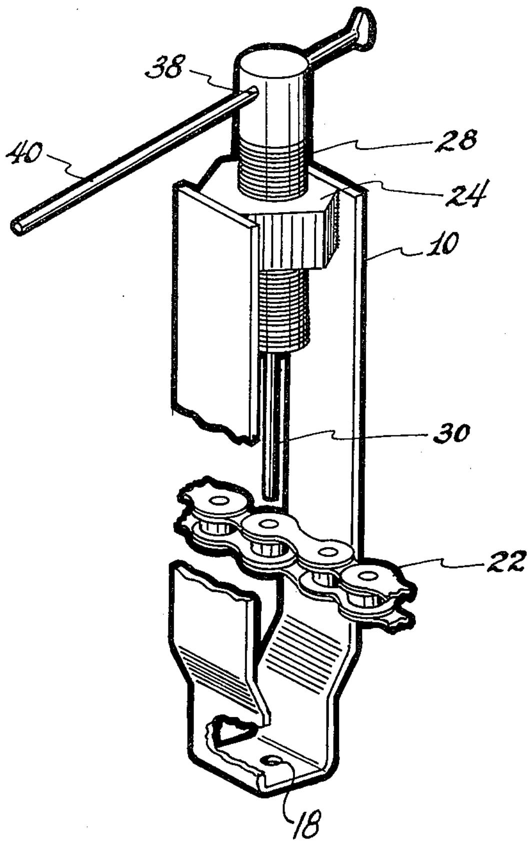
FIG. 3 is an oblique view of a chain breaker having a second preferred embodiment.

While the chain breaker illustrated in FIG. 1 is ideally suited for altering or repairing endless chain or chain mounted on a motorcycle or the like, the embodiment illustrated in FIG. 3 can be utilized to remove links or the like in small chain which is jointed by a clip type master link assembly and which can accordingly be "broken" by disassembling the master link assembly.

This chain breaker includes a U-shaped frame including a pair of arms 12 extending in spaced parallel relation. The sleeve member 24 is welded or otherwise secured to the free ends of the arms with the threaded bore 26 thereof extending parallel to the opposing arms 12 of the U-shaped member. The base portion 13 of the opposing arms is crimped inwardly to define a selectively sized channel, having substantially parallel sides for receiving the chain.

The bottom portion of the U-shaped frame intermediate the opposing arms 12 includes a bore 18 for receiving a pin 20 of a chain, which is located within the channel and the extractor pin 30 extends precisely coaxial with the located pin 20. Manual rotation of the push out screw by a handle 40 or the like will accordingly push the pin completely through the pin receiving bore.

What I claim is:

1. A chain breaker comprising a lever bar, a frame including a pair of opposing arms each having a bore extending therethrough for selectively receiving said lever bar, said lever bar including a bore extending transversely therethrough for receiving a pin of a chain, means for maintaining the received lever bar with said pin receiving bore at a predetermined orientation, means for locating the received, oriented lever bar with the pin receiving bore thereof at a predetermined longitudinal position, a push out screw including an extractor pin, and support means secured to said frame for threadedly receiving said push out screw with said extractor pin in coaxial relation with the oriented and longitudinally positioned pin receiving bore of said received lever bar.

2. A chain breaker according to claim 1, wherein said frame comprises a U-shaped member having a through-bore for receiving said push out screw.

3. A chain breaker according to claim 2, further comprising means for selectively rotating said threadedly received push out screw.

4. A chain breaker according to claim 2, wherein said lever bar is square in cross-section and said orientation maintaining means comprises said U-shaped frame arm bores selectively configured for matingly receiving said lever bar.

5. A chain breaker according to claim 4, wherein said locating means comprises projection means projecting outwardly from said lever bar.

6. A chain breaker according to claim 5, further comprising means for maintaining said lever bar at said predetermined longitudinal position.

7. A chain breaker according to claim 6, wherein said maintaining means comprises detent means.

8. A chain breaker according to claim 7, further comprising means for selectively rotating said threadedly received push out screw.

9. A chain breaker according to claim 1, further comprising a first plate selectively configured for placement on the fully inserted lever bar intermediate said arms, said first plate including a pair of selectively sized and located pin receiving blind bores, and a second plate selectively configured for placement intermediate said arms and including a pair of selectively sized and located pin receiving through bores.

10. A chain breaker according to claim 9, further comprising means for preventing the transverse displacement of said first and second plates.

11. A chain breaker according to claim 10, wherein said first and second plates are H-shaped each including opposing recesses for receiving the opposing arms of said frame, whereby the transverse displacement of said first and second plates will be prevented.

12. A press or drive fit master link assembler comprising a lever bar, a frame including a pair of opposing arms each having a bore extending therethrough for selectively receiving said lever bar, a push out screw including a coaxial, outwardly projecting pin, support means secured to said frame for threadedly receiving said push out screw, a first plate selectively configured for placement on the fully inserted lever bar intermediate said opposing arms, said first plate including a pair of selectively sized and located pin receiving blind bores, and a second plate selectively configured for placement intermediate said arms and including a pair of selectively sized and located pin receiving through bores.

13. A press or drive fit master link assembler according to claim 12, further comprising means for preventing the transverse displacement of said first and second plates.

14. A press or drive fit master link assembler according to claim 13, wherein said first and second plates are H-shaped each including opposing recesses for receiving the opposing arms of said frame whereby the transverse displacement of said first and second plates will be prevented.

15. A press or drive fit master link assembler according to claim 14, wherein said frame comprises a U-shaped member having a through-bore for receiving said push out screw.

16. A press or drive fit master link assembler according to claim 15, further comprising means for selectively rotating said threadedly received push out screw.

* * * * *